Aug. 10, 1937.  L. M. PLYM ET AL  2,089,618

APPARATUS FOR CONTROLLING ELECTRICAL CIRCUITS

Filed Feb. 20, 1935  4 Sheets-Sheet 1

INVENTORS
LESTER M. PLYM
MARON W. NEWCOMB
BY John A. Burgener
ATTORNEY

Aug. 10, 1937.　　　L. M. PLYM ET AL　　　2,089,618
APPARATUS FOR CONTROLLING ELECTRICAL CIRCUITS
Filed Feb. 20, 1935　　　4 Sheets-Sheet 2
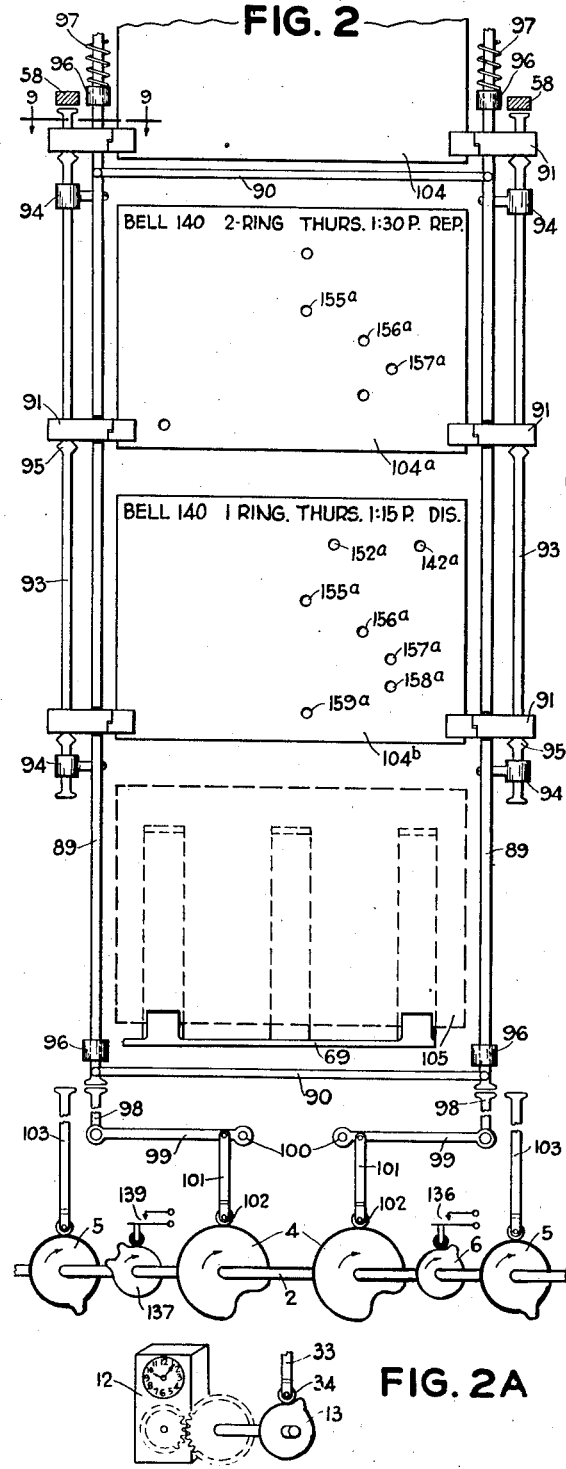
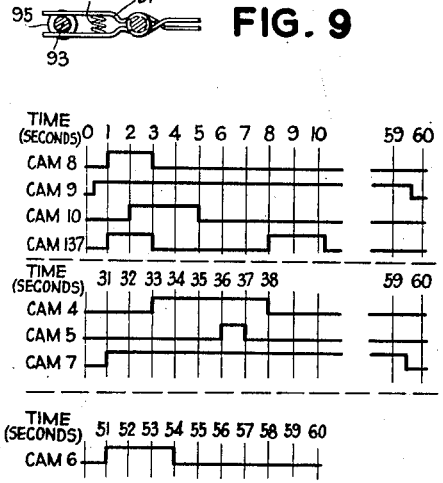
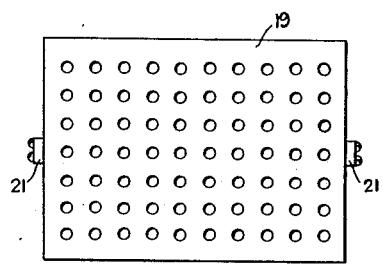
INVENTORS
LESTER M. PLYM
MARON W. NEWCOMB
BY
ATTORNEY Aug. 10, 1937.   L. M. PLYM ET AL   2,089,618
APPARATUS FOR CONTROLLING ELECTRICAL CIRCUITS
Filed Feb. 20, 1935   4 Sheets-Sheet 3

INVENTORS
LESTER M. PLYM
MARON W. NEWCOMB
BY John A. Burgmer
ATTORNEY

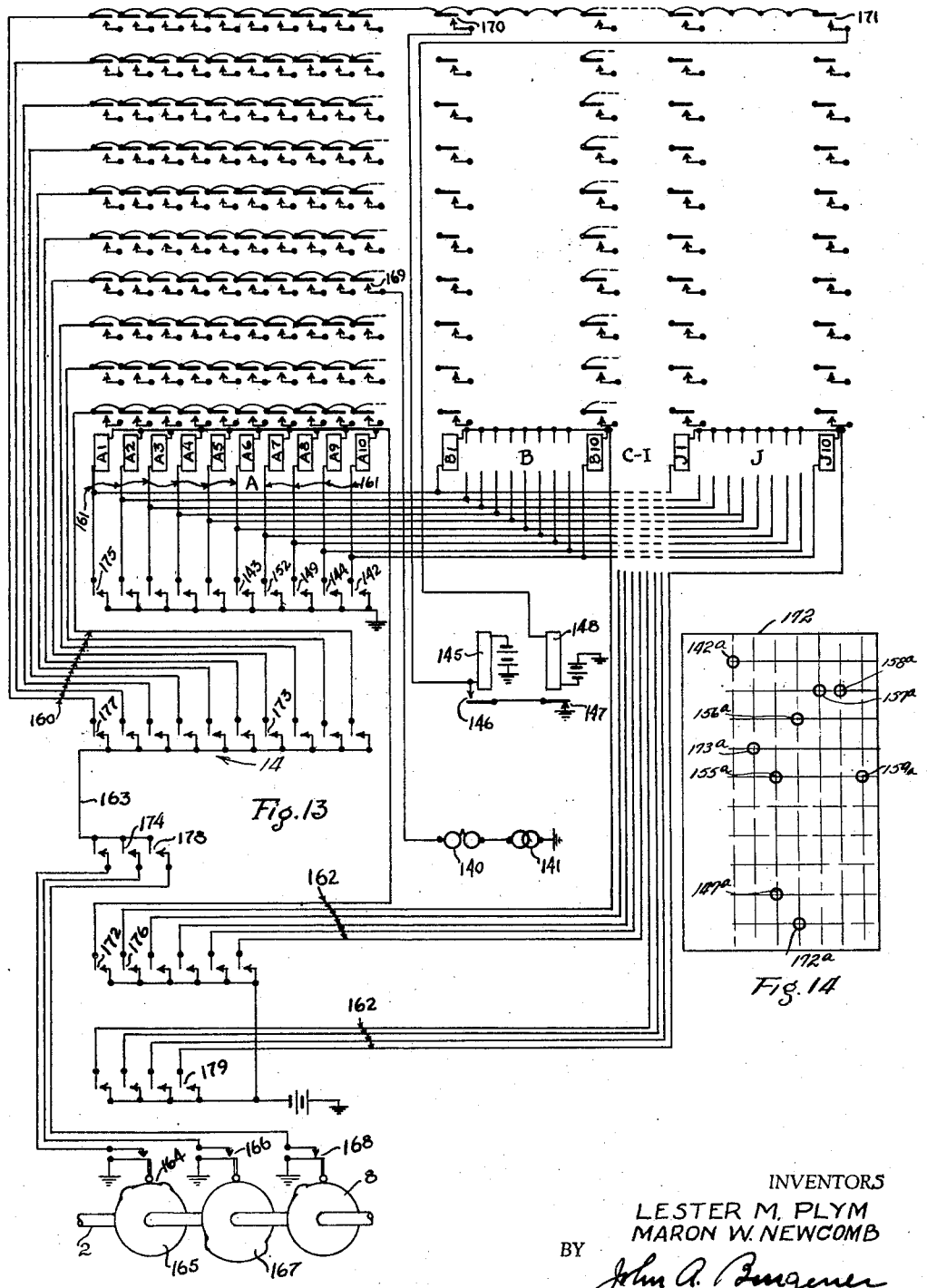

Patented Aug. 10, 1937

2,089,618

UNITED STATES PATENT OFFICE 2,089,618

APPARATUS FOR CONTROLLING ELECTRICAL CIRCUITS

Lester M. Plym and Maron W. Newcomb, Glen Ellyn, Ill.

Application February 20, 1935, Serial No. 7,459

21 Claims. (Cl. 161—1)

This invention relates to improved methods and apparatus for controlling electrical circuits and has particular reference to methods and apparatus for controlling selected electrical circuits in accordance with a predetermined program.

The primary object of the invention is to produce a device of this character which is simple and compact in construction, relatively inexpensive to manufacture, easily maintained in operation, efficient in use, and which lends itself readily to changes in the program of operations.

More specifically, it is an object of the invention to produce a program device having a relatively large capacity both with respect to the number of circuits or operations controlled and to the time intervals at which the control may be effected which, by reason of its improved construction and method of control, can be made in small and compact form.

Another object of the invention is to produce a program device in which the program of operations can be varied readily and conveniently both as to the number and sequence of operations without any changes in the device itself.

Another object of the invention is to produce a program device in which the control of each circuit or operation is effected by means of data recorded on a separate, individual pattern card, token, or other recording medium.

Another object of the invention is to produce a program device in which each record medium is tested or read periodically until the operation indicated by the data recorded thereon has been effected.

Another object of the invention is to produce a program device employing a time change-over mechanism in the form of a regularly time-varied pattern conforming in general to the time patterns of the record media.

Another object of the invention is to produce a program device in which the time identifying or designating pattern carried by a record medium is compared periodically with a time-varied pattern produced by a time change-over mechanism.

A further object of the invention is the provision of a novel and efficient means for storing record media in the form of pattern cards, for automatically feeding them to the record reading mechanism as required, and for automatically returning them to storage for use in a succeeding cycle of operation.

Still another object of the invention is the provision of means in a pattern card controlled program device whereby the pattern cards are conveniently displayed to give a visual indication of the operation last effected, the operation to be effected next, and the operation to succeed the last mentioned operation.

Another object of the invention is to provide in a pattern card controlled program device, a means for automatically discarding a pattern card under control of data recorded thereon indicating that the operation designated by the card is to be effected in only one cycle of operation of the device.

Another object of the invention is to produce a pattern card controlled program device in which the cards are automatically fed through the device in regularly repeated cycles.

Another object of the invention is to provide in a program device adjustable mechanism for handling varying numbers of the record media without necessitating any material alteration of the device itself.

Another object of the invention is to provide improved auxiliary circuit controlling means for use in conjunction with a program device whereby the capacity of the device is materially increased.

Another object of the invention is to provide an improved sensing or record reading mechanism for reading the data recorded on pattern cards or the like.

Another object of the invention is the provision of a means for feeding pattern cards to card sensing or reading mechanism responsive to the preceding card having effected a circuit closing operation.

Another object of the invention is to provide a program device comprising a group of readily disassembled units.

Other objects and advantages of the invention will become apparent from the following description taken in connection with the accompanying drawings of which:

Fig. 2 is a front elevational view of the card feeding rack showing cards in the two display positions and in the test or reading position.

Fig. 2a is a schematic representation of the various cams employed in the operation of a device embodying the invention.

Fig. 9 is a plan view of one of the card grasping fingers taken on the line 9—9 of Fig. 2.

Fig. 10 is a plan view of the card reading rod control plate.

Fig. 12 is a diagrammatic representation showing the timing of the various operations of the device.

Fig. 13 is a schematic diagram of the auxiliary electrical apparatus associated with the program device to increase its capacity.

Fig. 14 shows a pattern card perforated for use with the device equipped with the auxiliary apparatus shown in Fig. 13.

Figure 5:
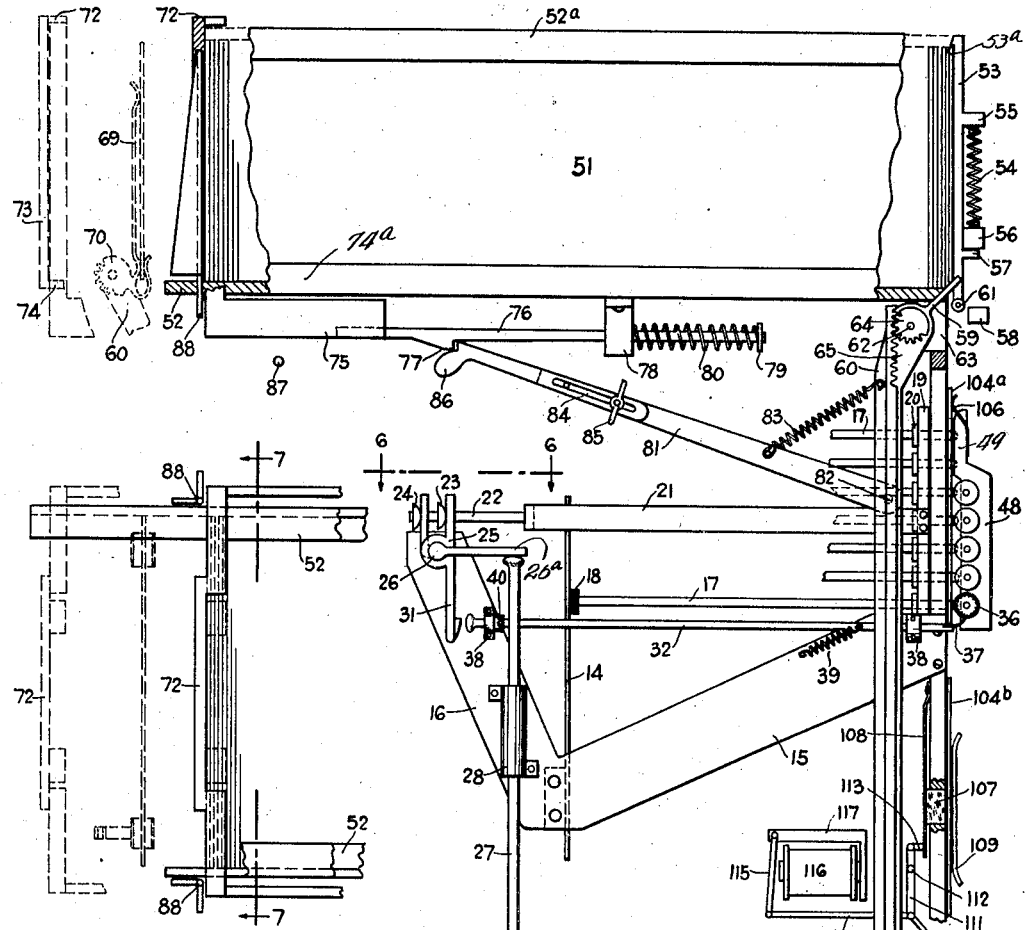
Fig. 5 is a fragmentary top view of the rear end of the card storing rack showing the card retaining fingers in their normal and retracted positions.

While the invention is susceptible of numerous modifications and alternative constructions, we have shown in the drawings and will herein describe a preferred embodiment, but it is to be understood that we do not thereby intend to limit the invention to the specific form disclosed, but intend to cover all modifications and alternative constructions falling within the spirit and scope of the invention as expressed in the appended claims.

In general, the invention contemplates that each operation of the program or the circuit for controlling the same, will be represented by a separate, independent record medium on which is recorded data identifying the operation and data indicative of the time at which the operation is to be effected. In the particular embodiment herein disclosed, the record medium employed is a flat plate or card on which the date is recorded by perforations spaced in accordance with a predetermined pattern. The cards are normally stacked in a storage rack in the order in which the operations are to occur. For example, if there are one hundred operations to be effected in the period represented by one cycle of operation of the device, say a period of one week, one hundred cards, one for each operation, will be placed in the rack. A change in the program of operations may be made by simply removing a card or cards or by inserting one or more new cards as required. The functioning of the remaining cards is not affected by this change. Moreover, no change whatever is required in the device itself.

Provision is made for automatically withdrawing cards from the storage rack, one by one, and for feeding them to the sensing or reading mechanism as they are required. While one card is held in operative relation to the reading mechanism, the card next to be read is displayed in a "waiting" position and the card previously read is displayed in a "used" position. Visual inspection can thus be made conveniently to determine the status of the program at any particular instant. Feeding of cards takes place only after and responsive to the reading mechanism finding a pattern which permits of the closure of an operation controlling circuit. In other words, each card is held in the reading position until the time recorded thereon corresponds with the time indication of the time change-over mechanism whereupon the circuit or operation indicated by the data on the card is effectuated. This arrangement makes it unnecessary to provide cards for time periods or instants at which no operations are scheduled and effects economies in and simplifies the operation of the device. By way of illustration, the present device is arranged so that it is capable of completing an operation controlling circuit at any desired minute of a period of one week. This means that an operation may be scheduled for any or all of the 10,080 minute time intervals of the period. However, if only one hundred operations are to be effected during this period, that is, during one operating cycle of the device, only one hundred pattern cards are required to control the device. This arrangement makes it practical to construct the device to comparatively small dimensions without sacrificing either capacity or flexibility.

Provision is also made for returning the used pattern cards to the storage rack for use in the succeeding operating cycle of the device. This return operation is entirely automatic so that the device requires attention only when a change in the program is to be made. On the other hand, certain operations may be required only once and need not be repeated during the next operating cycle of the device. To take care of this condition, means have also been provided for automatically discarding the pattern cards after their operation is performed if so recorded on the individual card.

For the purpose of interpreting the data of the record media, a record reading mechanism which both reads the data and compares them with a variable standard has been provided. The standard, in the present instance, takes the form of a time change-over mechanism adapted to present a pattern of the same general character as that of the record media which pattern is varied in 10,080 uniform steps by means of a timing device. The reading-comparing operations are performed periodically at uniform intervals throughout each operating cycle of the device and are repeated in succeeding cycles. The interval at which these operations occur is determined by the requirements of each particular case and are governed by the construction of the time change-over device. The intervals may be of any desired length, as one minute, two minutes, one-half minute, one hour, etc. Likewise, the operating cycle may be made of any reasonable length without unduly complicating or enlarging the device.

Control of the data reading, time change-over, and card feeding mechanism is effected through the medium of cams driven by suitable spring or electrical motors. These cams operate through a series of push rods which are divided to permit the cam mechanism to be readily separated from the other mechanism by a simple and easily performed operation.

When used alone, the program device herein illustrated is equipped to control thirty-seven separate circuits. To increase this capacity without adding to or substantially altering the device itself, auxiliary circuit controlling apparatus is provided. In the present instance, this apparatus takes the form of a plurality of relay groups so interconnected with the circuit controlling contacts of the device that the relays can be energized selectively by the closure of certain definite combinations of contacts. By this arrangement, the capacity of the device may be greatly increased.

In the particular embodiment of the invention shown herein, the essential elements constituting the program device have been shown in their normal relationship. Structure not directly concerned with the invention has been omitted as far as practicable in order to avoid unnecessarily complicating the disclosure. The general construction of the device comprising the invention and its operation will be readily apparent from the various figures of the drawings and the following detailed description of the preferred embodiment of the device illustrated therein.

In the illustrative embodiment, power for all operations except actual timing, is supplied by a motor 1 (Fig. 1), preferably electrically driven from a source of current 1', which rotates a cam shaft 2 through a speed reducing gear train 3. The various operating cams are shown schematically in Fig. 2a of the drawings as being fast on the shaft 2 but it will be understood that certain of these cams may be carried by auxiliary shafts which are gear connected to the shaft 2. This group of cams includes card shift cams 4, card release cams 5, a discard cam 6, a reading rod plate control cam 7, a grounding cam 8, a continuity cam 9, a card return cam 10. The cams are so formed that they effect the various operations of the device in the proper sequence and at the proper times as will hereinafter be described in more detail. In the present instance, the motor 1 is designed to rotate the shaft 2 at a rate of approximately one revolution per minute. Extremely accurate timing of this rotation is unnecessary because the actual timing operations are controlled by a clock motor 12 which may be either spring or electrically driven. The motor 12 rotates the timing cam 13, in this instance, at a rate of exactly one revolution per minute. The light loading of the clock motor and the delegation of the heavier operations to a less accurately timed motor is an important factor in keeping the cost of the device at a low figure while maintaining efficient and reliable operation.

Figures 1, 6:
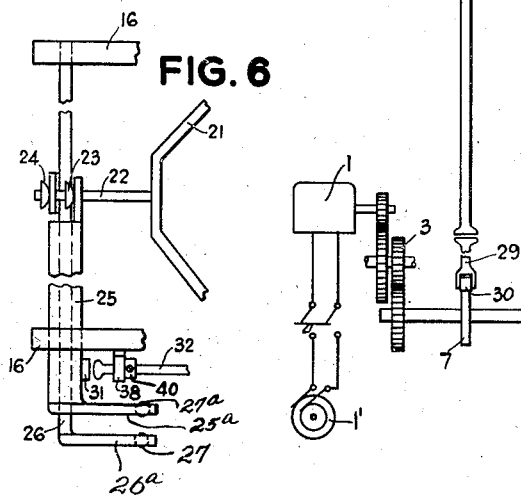
Fig. 1 is a side elevational view of a program device embodying the features of the invention and showing the general arrangement of the card storing and handling mechanism and the card reading mechanism.
Fig. 6 is a top view of the rear end of the finger plate bracket and associated apparatus for actuating the same taken approximately in the plane of line 6—6 of Fig. 1.
Figure 3:
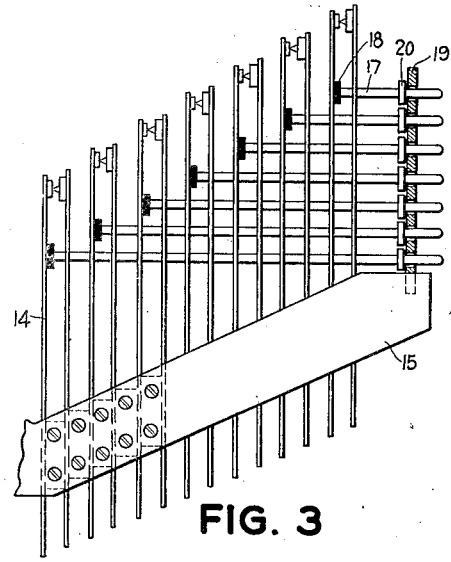
Fig. 3 is a side view of one row of the circuit controlling contacts with their associated card reading rods.
Figure 4:
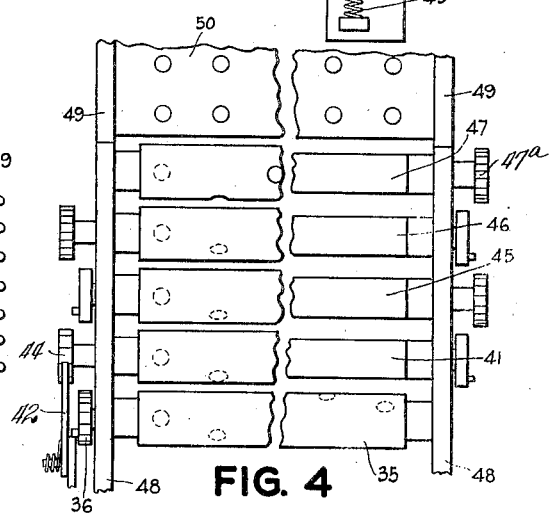
Fig. 4 is a fragmentary front view of the time change-over mechanism.

The general arrangement of the card reading mechanism provided in the present instance is shown in Figs. 1 and 3. A bank of vertically disposed contact springs 14 is mounted on insulators secured between the inclined arms 15 of a pair of brackets 16 which are secured to the framework in any suitable manner. Each pair of contact springs is mounted slightly below the level of the preceding spring pair so that the upper ends of the springs present a stepped formation and the contacts thereof are readily accessible for cleaning or adjustment. The rear spring of each pair is operatively associated with a reading rod 17 which is insulated from the spring by an insulating washer 18. Each reading rod extends forwardly through apertures in the preceding springs and is supported at the outer end in an aperture in a reading rod control plate 19. Each reading rod is further provided with a rigidly attached collar 20 which bears against the rear face of the control plate. Thus, when the plate is moved back, the reading rods are likewise shifted and force their associated springs back to separate the normally closed contacts of the spring pairs.

In the present instance, space is provided for ten vertical sets of contact springs arranged in seven horizontal rows. A portion of the contacts is employed in connection with the interpretation of the time data of the pattern cards and the remaining contacts are available for operation controlling circuits. To provide for one minute control intervals over an operating cycle of one week, it has been found convenient to provide contacts arranged in the order indicated in the circuit diagram illustrated in Fig. 11. Referring to the said Fig. 11, the contact sets located below and to the right of the broken line X—X are reserved for time data reading. It will be noted that in the lowermost horizontal contact row, the full complement of ten contacts is used for this purpose. In the second and third horizontal rows, six contacts of each row are used. In the fourth row, four contacts are used, and in the fifth row, seven contacts are used for time data reading. The remaining contacts of the second to fifth rows and all of the contacts of the sixth and seventh rows are reserved for circuit control.

In the contact arrangement above described, the contacts of the five lower horizontal rows which are reserved for reading the time data of the pattern cards, each have a definite relation to the operating cycle of the device. The ten contacts in the lower row, for example, correspond to ten one minute intervals. The six contacts of the second row correspond to the six ten-minute intervals constituting an hour. The six contacts of the third row correspond to six one-hour intervals constituting a quarter of a day. The four contacts of the fourth row correspond to four six-hour intervals constituting a day and the seven contacts of the fifth row correspond to the seven one-day intervals constituting a week. The two upper contact rows and the surplus contacts of rows 2–5, are reserved for circuits to be controlled thereby making the device as illustrated capable of controlling thirty-seven different operations. It will be apparent, however, that this number can be increased to any reasonable number desired either by increasing the number of contacts in each row or by providing additional rows or by means of the auxiliary attachments hereinafter described. The object in arranging the contacts and their associated reading rods in the particular manner above described will become apparent as the description proceeds.

The control plate 19 which actuates the reading rods 17 and thereby controls the opening and closing of the contacts is secured at opposite sides to the two legs of a U-shaped bracket or fork 21 which is slidably supported in a horizontal position on the frame of the device. To the rear end of the fork 21 is rigidly attached a rod 22 (Figs. 1 and 6) provided with two rigid collars 23 and 24. Collar 23 bears against the upwardly extending arm of a bell crank lever 25 and collar 24 bears against the upwardly extending arm of a bell crank lever 26. The shank of the latter lever is disposed coaxially in the tubular shank of the lever 25 and both levers are journalled for pivotal rotation in bearings formed in the upwardly inclined arms of the brackets 16. The fork 21 which is normally urged into its forward position by the contact springs is thus adapted to be moved back from its normal position by the actuation of either of the bell crank levers. This, of course, moves back the plate 19 and the reading rods 17 and results in the opening of all of the normally closed contacts of the contact bank.

The bell crank lever 26 is provided with a horizontally extending arm 26ª which rests upon the upper end of a push rod 27 slidably supported on the bracket 16 by a bearing member 28. The lower end of the push rod 27 rests on the upper end of a short push rod 29 which has cam follower in the form of a roller 30 engaging the cam 7 (Figs. 1 and 2a). The pressure exerted by the contact springs maintains the cam follower in engagement with the cam. During a portion of each revolution of the shaft 2, the cam face of cam 7 will force the push rods 29 and 27 upwardly, thereby rotating the bell crank 26 on its pivot and retracting the reading rod control plate 19.

The bell crank 25, as before explained, has a tubular shank through which the shank of bell crank 26 extends (see Fig. 6). Rigid with the tubular shank is a depending arm 31 provided with an enlargement at its lower end adapted to engage one end of the horizontally disposed push rod 32 when the lever is actuated. The push rod 32 which serves to actuate the time change-over mechanism as will be described hereinafter, is slidably supported on the bracket 16 by the bearing members 38. The bell crank lever 25 also has a horizontal arm 25ª which rests upon the upper end of a push rod 27ª which, in turn, rests upon the upper end of a short push rod 33 (Fig. 2a). A cam follower 34 on the lower end of the push rod 33 engages the cam 13 which, as before explained, is rotated at a rate of one revolution per minute by the clock motor 12. Accordingly, once each minute, the cam face of cam 13 will lift the push rod 33 and thereby actuate lever 25 to retract the reading rod control plate 19 and to actuate the push rod 32.

The time change-over mechanism, which operates in conjunction with the control fingers, above described, is shown in Figs. 1, 4, 6 and 8 of the drawings. This mechanism comprises, in the present instance, a set of five cylindrical members or time rollers each having a series of radially extending holes or apertures spaced in a spiral around the periphery of the member. The lowermost roller 35 is provided with ten apertures so spaced that, on each of ten steps, the apertures will be presented in succession opposite successive holes in the lower horizontal row of the plate 19. The member 35 is provided with a ten-toothed ratchet wheel 36 adapted to be engaged by a spring pawl 37 carried on the end of the push rod 32. The push rod is normally held away from the roller by a spring 39 which urges the rod to the left as viewed in Fig. 1, until the stop collar 40 engages the rear bearing 38. As explained hereinbefore, push rod 32 is forced to the right by arm 31 of bell crank lever 25 when the lever is actuated. Since the lever is actuated once each minute by the cam 13, push rod 32, through the medium of pawl 37, will advance the ratchet wheel and time roller 35 one step each minute. Accordingly, the ten apertures in the roller, by reason of their uniform spiral spacing, will be presented successively opposite successive holes in the lower row of plate 19.

Figure 8:
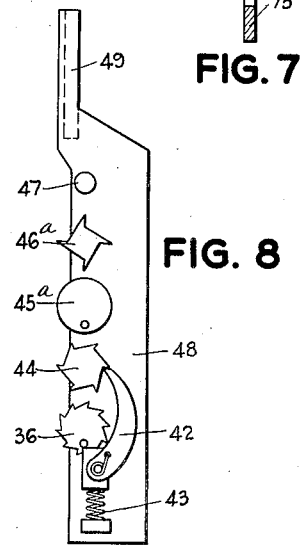
Fig. 8 is a fragmentary side view showing an example of the ratchet drive mechanism provided for actuating the time rollers of the time change-over mechanism.

An adjacent cylindrical member or time roller 41 is generally similar to the roller 35 except that it is provided at one end with six spirally disposed apertures and the portion which would normally be presented opposite the last four contacts of the row is of reduced diameter so that it has no effect on the reading rods occupying these positions. The roller 41 is designed to make a complete revolution in six steps and is driven from the member 35 in any suitable manner as by a Geneva movement or by a spring operated pawl 42 as shown in Fig. 8 of the drawings. The pawl 42 is supported in a position so that it will be depressed by a projection on the ratchet wheel 36 as the roller 35 moves into its tenth position. As the roller takes its eleventh step, the projection on the wheel passes over the edge of the pawl supporting member and permits spring 43 to urge the pawl upwardly and advances the ratchet wheel 44 and its associated time roller 41 one step. The six apertures in the roller 41 are thus presented successively opposite the first six holes in the second row of the plate 19.

A third time roller 45 is similar to roller 41. It is provided with six spirally disposed apertures and has a portion of reduced diameter of a length equivalent to the space required by four holes in the plate 19. The roller 45 is adapted to make a complete revolution in six uniform steps and is driven from the roller 41 by a pawl mechanism (not shown) similar to that which drives the roller 41. For cooperating with the pawl mechanism, one end of the roller 45 is formed with an enlarged disk-shaped portion 45ª carrying a pin similar to that carried by the ratchet wheel 36. The apertures in this roller are presented successively opposite successive ones of the first six holes in the third row of plate 19 and the reduced portion of the roller is disposed adjacent the last four holes in this row.

A fourth time roller 46, provided with four spirally disposed apertures and a portion of reduced diameter equivalent to six apertures is adapted to make a complete revolution in four steps. This roller is advanced one step for each revolution of the roller 45 by a pawl mechanism such as that described coacting with a ratchet wheel 46ª formed on the end of the roller. The apertures in this roller are presented opposite successive ones of the first four holes in the fourth row of plate 19 and the reduced portion of the roller is presented opposite the last six holes in this row.

A fifth time roller 47, having seven spirally disposed apertures and a reduced portion equivalent to three apertures is adapted to make a complete revolution in seven steps. It is advanced one step for each revolution of the roller 46 by means of a pawl, similar to the pawl 42, actuated by the roller 46, and adapted to coact with a ratchet wheel 47ª formed on the end of the roller 47. The apertures in this roller are presented opposite successive ones of the first seven holes in the fifth row of plate 19 and the reduced portion is presented opposite the last three holes in this row.

It will be apparent from the foregoing that the roller 47 will rotate at the slowest rate of the five and that the rates of revolution of this and the other rollers will depend upon the ratio of the ratchet wheels provided for the same. In the present instance, the roller 47 is set to make one complete revolution in a period of one week and a different one of the seven apertures therein is thus presented opposite a reading rod control plate aperture each day. Member 46 will make seven revolutions for each revolution of roller 47 or one revolution each day of the week. Member 45 makes four revolutions for each revolution of roller 46 or four revolutions per day. Roller 41 makes six revolutions for each revolution of roller 45, that is, twenty-four revolutions per day or one hundred sixty-eight revolutions per week. Member 35 makes six revolutions for each revolution of roller 41 or one thousand and eight revolutions per week. Since roller 35 presents a different aperture on each of its ten steps, it is obvious that the five rollers arranged in the manner described present the apertures in a total of 10,080 different patterns during the period of one week. This, it will be noted, corresponds to the number of minutes in the week, hence, a distinctive, individual pattern is produced for each minute of that period.

The rotary members or rollers above described are supported on the frame opposite the plate 19 by two supporting members 48. Each of these members is provided at its upper end with an extension 49 between which is held a backing plate 50. The plate 50 is provided with two rows of ten holes each positioned to aline with the two upper rows of holes in the plate 19. It serves to support the upper portion of the pattern card during the reading operation.

The time rollers, above described, are supported on the frame immediately in front of the plate 19 so that, with no pattern card interposed between the rollers and the plate, one aperture in each roller will be in such position that one similarly located reading rod in each of the contact rows provided for timing purposes will be projected into the aperture when the plate 19 is advanced to its forward position. All of the other reading rods of this group will engage the unperforated surfaces of the rollers and will be held back sufficiently to maintain their associated contacts open. The reading rods which are in a position to enter the apertures will do so, being urged forwardly by the springs against which they abut, and will permit their associated contacts to close. This will effect certain operations of the device to be described hereinafter.

The reading rods associated with contacts reserved for circuit control purposes, that is, the contacts in the two upper contact rows and the surplus contacts of the second to fifth rows, inclusive, do not engage the time rollers. These fingers are held back only by engaging unperforated parts of the pattern cards in the "reading" position of the device and will be described presently.

The mechanism provided for handling the pattern cards, that is, storing them, feeding them to the reading mechanism above described, and returning them to storage, comprises a storage rack 51 (Fig. 1) in the form of a rectangular box-like receptacle. The cards are supported in the rack by two bottom strips 52 preferably formed integrally with the side members 52ª. The rack 51 is detachably supported on the frame of the device so that it can readily be removed and taken to a convenient place when necessary to rearrange or change the pattern cards. At the front end of the rack is provided a slidably supported card starting plate 53 which has an inwardly extending tooth 53ª on its upper inner edge. This tooth is so proportioned that it engages a single card and serves to move the same downwardly to a position in which the card can be grasped by the mechanism provided for the purpose. Normally, the plate is held in the position shown in Fig. 1 by a spring 54 disposed between a projection 55 on the plate and a projection 56 on the frame. A lug 57 on the plate engages the projection 56 and a similar projection 58 to limit the travel of the plate 53. The plate is adapted to be moved downwardly against the force of spring 54 by a projecting member 59 on a card return arm 60 which engages a roller 61 carried by a stud projecting from one edge of the plate.

The arm 60 is pivoted at 62 on a bracket 63 attached to the frame. Integral with or rigidly secured to the upper end of the arm 60 is a segment gear 64 engaging a rack 65 formed on the upper end of a push rod 66. The push rod rests upon the upper end of a short push rod 67 provided with a cam follower 68 engaging the cam 10 (Figs. 1 and 2a). When the push rod is moved upwardly, gear 64 is rotated in a clockwise direction and swings the arm 60 on its pivot. The member 59 moves with the arm and engages the roller 61 to move down the plate 53 and the card engaged by its tooth 53ª.

On the lower end of the arm 60 there is pivotally mounted a card holding member or cradle 69 (Fig. 2) adapted to receive and hold used program cards which are to be returned to the storage rack. Integral with this member is a segment gear 70 which engages a rack 71 supported on the frame. With the arm 60 in normal position, the cradle 69 will be held in a substantially vertical position as shown. As the arm 60 swings on its pivot, the rack causes the gear to rotate the cradle 69 so that it will be in the position shown in dotted line in Fig. 1 when the arm reaches its highest position.

Figure 7:
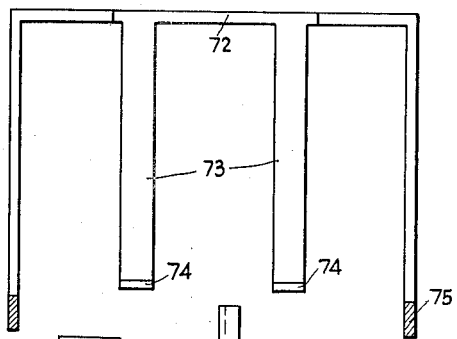
Fig. 7 is a view of the card shifting fingers taken on the line 7—7 of Fig. 5.

The pattern cards are normally pressed forward in the card rack by a finger member 72 (Figs. 1, 5 and 7). The member comprises an inverted U-shaped portion having two slightly offset, depending fingers 73 which are so spaced that they can pass between the upstanding fingers of the cradle 69. Each of the fingers 73 has a forwardly projecting flange 74 on its lower end which flanges are adapted to extend under and support a pattern card as the same is being transferred from the cradle 69 to the storage rack. The legs of the member 72 are rigidly secured to an inverted channel member 74ª which is supported beneath the storage rack for slidable movement longitudinally thereof. Member 75 supports the member 72 above the rack with the fingers projecting vertically therethrough and abutting against the last card in the rack. Secured to the member 75 is a horizontally disposed rod 76 having a downwardly projecting lug or tooth 77. The rod is slidably supported in a bearing 78 secured to the storage rack and is provided with a rigidly attached collar 79 at its free end. A spring 80 bearing on the collar 79 and the bearing 78 urges the rod and associated parts forward and thus causes the fingers 73 to exert the required amount of pressure on the stack of cards in the storage rack and force them into engagement with the starting plate 53.

The lug 77 on the rod 76 is adapted to be engaged by one end of a lever 81 which is pivotally supported at 82 on the arm 60. The lever is kept in engagement with the rod 76 by a spring 83 which tends to draw the lever and its supporting arm together. Means for adjusting the length of the lever 81 to allow for varying members of cards in the storage rack is provided by the overlapping joint 84 and the securing thumb screw 85. The free end of the lever 81 is further provided with a projecting cam face 86 adapted to engage a projection 87 on the frame when the lever has been moved to its leftmost position.

It will be apparent from the foregoing that, when the arm 60 swings on its pivot as previously described, the lever 81 will be shifted to the left and will force the rod 76 and finger member 72 back from the stack of cards in the rack. The various parts are so proportioned that the member 72 will be moved back sufficiently to permit the cradle 69 to move in ahead of it as shown in dotted line in Figs. 1 and 5. At this point, the cam face 86 will engage the projection 87 thereby forcing the lever 81 out of engagement with the lug 77. The spring 80 will quickly return the member 72 to its normal position. In case a card is being returned by the cradle 69 at this time, the fingers 73 with their flanges, will disengage the card from cradle and deposit it in the storage rack. The used cards are thus returned to the storage rack for use in the succeeding operating cycle of the device.

In order to hold the stored cards in place during the operation above described, two temporary card holding members 88 are provided. These members are pivoted on the sides of the storage rack and each member has two perpendicularly disposed, triangular side portions or wings. The members are normally held with the inner wings substantially parallel to the axis of the rack and the outer wings perpendicular thereto as shown in Fig. 5. As the member 75 is moved back by the lever 81, a shoulder thereon engages the outer wings of the members 88 and rotates them on their respective pivots so that the inner wings bear against and support the cards in the rack. When the member 75 is restored to normal, the members 88 are permitted to return quickly to their normal position, being urged thereto by springs (not shown), and the card caught by the fingers 73 is deposited on the stack in the storage rack.

The apparatus for feeding the pattern cards to the data reading mechanism is shown in Fig. 2 of the drawings. This comprises a rectangular frame consisting of parallel upright members 89 rigidly connected together by transverse members 90. At spaced points on the members 89 are secured three sets of card grasping fingers 91. Each of the finger sets comprises two of the fingers 91 held rigidly in the same plane by engaging slots in the members 89. Adjoining sets are separated by a space equal to the width of one pattern card plus the distance which the card starting plate 53 initially shifts a card when starting it from the storage rack.

The card grasping fingers 91 comprises two crossed lever members (Fig. 9) pivoted on the axis of the members 89. A spring 92 pulls the outer ends of the lever members together thereby causing their inner ends to clamp together and grasp any object interposed between them. To open and close these fingers there is provided a cam rod 93 slidably supported in the brackets 94 on the members 89. The cam rod is provided with enlarged cam portions 95 disposed immediately below the respective card grasping fingers 91. When the rods are forced upwardly, the cam portions 95 wedge the lever members of the fingers apart against the tension of the springs 92, thereby causing the fingers to release their grasp upon the object held between the inner finger ends. The cam portions of the rods are so proportioned that they are held by friction between the lever members of the fingers until released by the rods engaging projections 58. Downward movement of the cam rods is limited by the cam portions 95 engaging the upper faces of the brackets 94.

The positioning of the pattern cards and the opening and closing of the card grasping fingers is effected through the reciprocation of the card frame, the lateral members 89 of which are slidably supported in bearings 96 carried by the frame of the device. Springs 97 secured to the upper ends of the members 89 and to the upper bearings 96 urge the frame downwardly so that the lower ends of the members 89 rest upon the tops of push rods 98. The lower end of each of the push rods 98 is pivotally attached to the end of a lever 99 which is, in turn, pivoted at 100 on a stationary part of the framework. Attached to each of the levers 99 at a point intermediate the two pivotal points, above mentioned, is a depending arm 101 carrying a roller 102 which engages a cam 4. The ratio between the two arms of the lever 99 is such that, when the indented portion of the cam is engaged by the roller 102, the card handling frame is shifted downwardly by the springs 97 to a position in which the card grasped by the lower pair of fingers 91 will be deposited in the cradle 69 and the lower ends of the cam rods 93 will rest upon the upper ends of the push rods 103.

With the card frame in its lowermost position the cam projections of the cams 5 will engage the cam followers on the lower ends of push rods 103 thereby forcing the push rods and cam rods 93 upwardly and effecting the opening of the card grasping fingers 91 as previously described. Upon further rotation of the cams 4 the frame will be lifted to its uppermost position as shown in Fig. 2. As the frame approaches this position, the upper ends of the cam rods 93 will engage the frame projections 58 which force the rods out of the card grasping fingers and permit the fingers to close and grasp the various cards positioned before them.

The operations of the card handling frame above described are coordinated with the operations of the other parts of the device so that all operations take place in the proper sequence. By way of illustration, with three cards, 104, 104ᵃ and 104ᵇ in "waiting", "reading" and "display" positions respectively, as shown in Fig. 2, the sequence of operations will be as follows: When the frame is returned to its uppermost position, the cam rod 93 will be forced out of the fingers and the fingers will grasp the cards as shown. The upper pair of fingers 91 will grasp card 104, the intermediate pair of fingers will grasp card 104ᵃ and the lower pair of fingers will grasp card 104ᵇ. As the frame moves down under the influence of springs 97 and cams 4, the fingers will carry the various cards to their new positions, that is, card 104 to the position formerly occupied by card 104ᵃ, card 104ᵃ to the position formerly occupied by card 104ᵇ and card 104ᵇ to the position 105 shown in dotted line in Fig. 2. The fingers will release their grasp of the cards under the influence of the cams 5. Card 104 will then be retained in "reading" position by the friction springs 106 (Fig. 1) carried by the time roller supporting members 48. Card 104ᵃ will be retained in "display" position by the friction member 107 which is urged forwardly by a spring 108 to clamp the card against the friction plate 109. Card 104ᵇ will be held by the fingers of the cradle 69 by which it will be returned to the storage rack during the ensuing upward movement of the card handling frame. The above described cycle of operations will be repeated periodically whenever a change of cards in reading position is required. In other words, each card will be retained in reading position until such time as the operation designated by the card is effected and thereafter the cards will be shifted, one step at a time, and eventually returned to the storage rack or discarded.

Under certain conditions the card in "display" position may be discarded instead of being deposited in the card return cradle 69. The mechanism for discarding is shown in Fig. 1 and comprises the inclined plate 110 which is normally positioned with its lower front edge just back of the plane through which the cards are moved from "display" position to cradle 69. The upper end of this plate is secured to one end of a lever 111 pivoted on the frame at 112. The other end of the lever is connected by a link 113 with the free end of the spring 108. The end of the lever 111, to which the plate 110 is attached, is connected by a link 114 with the free end of an armature 115 of a magnet 116. The armature is pivotally supported by a heel piece 117 which also supports the magnet. The magnet when energized attracts the armature 115 which, through the medium of the link 114, rotates the lever 111 on its pivot. Spring 108 is retracted thereby withdrawing the friction member 107 from engagement with the card in "display" position and permitting the card to drop free. The plate 110 is thrust forward into the path of the card so that the card is deflected outwardly and thus discarded. The plate 110 is subsequently returned to its normal position by the spring 108, which becomes effective for this purpose upon the magnet 116 becoming deenergized.

Figure 11:
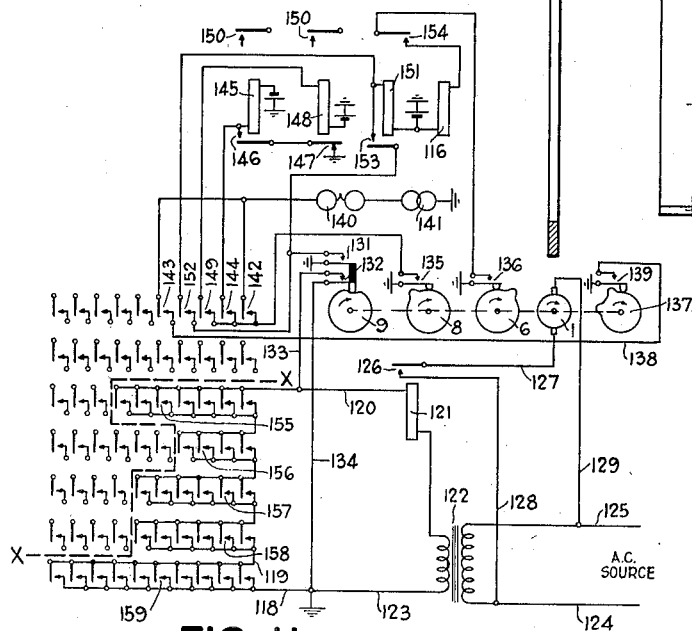
Fig. 11 is a schematic diagram of the electrical circuits of the device.

The electrical circuits provided for the program device herein shown and described and their relation to the mechanical control means employed, are shown in Fig. 11 of the drawings. Referring to this figure, it will be seen that corresponding contacts of each of the time rows are multiply connected throughout the row. The lowermost multiply connected contacts of the first row are connected to ground by a conductor 118. Thus when any contact of the first row is closed the ground connection will be extended over conductor 119 to the second row of contacts. The closure of any time contact in the second row, that is, any one of the six contacts at the right end of this row, as shown in Fig. 11, will extend the ground connection to the third contact row. The contacts in the third row will extend the ground connection to the fourth row and the contacts of the latter row, in turn, will extend the connection to the fifth row. Thus, when any one or more of the time contacts in each of the five rows are closed a chain circuit will be completed from ground, conductor 118, chain of closed contacts, conductor 120, winding of relay 121, secondary winding of step-down transformer 122 and conductor 123 to ground. The primary winding of the transformer 122 may be connected to any suitable source of alternating current by the conductors 124 and 125. The closure of the chain circuit, above described, energizes the relay 121, which closes its contact 126, thereby completing the circuit for the motor 1 over conductors 127, 128 and 129. The latter two conductors are branches of the conductors 124 and 125 respectively. The motor operates in the closed circuit to rotate the shaft 2 and the various cams shown in Figs. 2, 2ª and 11. The initial rotation of the continuity cam 9 effects the closure of contacts 131 and 132, the latter contact completing a holding circuit for the relay 121 over conductors 133 and 134. The relay accordingly remains energized and maintains the operating circuit of the motor to insure the operation of the cam shaft and cams through a complete revolution. Shortly after the cam 9 becomes effective cam 8 will close the contacts 135, thereby connecting ground to such of the circuit springs as are multiply connected with the contacts. Near the end of the rotational cycle, cam 6 will become effective to close the contacts 136 for completing a circuit to be described presently. Cam 137 in its rotation will transmit spaced ground impulses over conductor 138 when its cam projections effect the closure of the contacts 139. The cam as shown is arranged to transmit two short impulses spaced approximately five seconds apart, but it will be obvious to those skilled in the art that a cam or cams may be provided for this purpose which are capable of transmitting any desired number or combination of impulses.

A number of exemplary circuits have been shown in the upper portion of Fig. 11 to illustrate a few of the many ways in which the advantageous features of the present invention may be employed. These include a bell 140, connected to one side of a grounded generator 141 which will ring once in response to the closure of contacts 142 by a contact rod such as 17 (Fig. 3) and contact 135 of the cam 8. A code of two short rings will be produced when the circuit of the bell is closed via contacts 143 and contacts 139 of cam 137. The closure of the contacts 144 and 135 will energize relay 145 which, in the present instance, will complete a locking circuit for itself via contacts 146 and 147. Relay 145 may be kept in energized condition as long as required and can be de-energized at any desired time by opening its locking circuit at contacts 147. This may be effected conveniently by energizing relay 148 over a circuit including contacts 149 and 135. Both relay 145 and relay 148 may be provided with additional contacts 150 for controlling additional circuits or for effecting desired operations.

The relay 151 is provided for controlling the circuit of the discarding magnet 116 (Fig. 1) and its energizing circuit includes contacts 152 and contacts 131 of the continuity cam 9. Upon energizing, relay 151 completes a holding circuit for itself via contacts 153 and 131 to maintain its energized condition for a complete rotation of the cam mechanism independent of the reading rod operated contacts 152. Relay 151 also prepares a circuit at contacts 154 for magnet 116 which circuit is completed at contacts 136 closed by cam 6 near the end of the operating cycle. This cam action is so timed that the magnet 116 will remain de-energized until the pattern card which effects the operation of relay 151 is shifted to the "display" position, whereupon the magnet will become energized and effect the discard of such cards as before explained.

Having in mind the construction and arrangement of the various elements of the device comprising the invention as explained and described hereinbefore, the operation of the device under the control of a pattern card will now be described. For the purpose of this description, it will be assumed that pattern card 104ᵇ is in the "reading" position, that is, the position in which the pattern card 104ª is shown in Fig. 2, having been shifted thereto by a previous operation of the device, and that the time as indicated by the time change-over mechanism (Fig. 4) approaches the time represented by the data punched in the card.

The pattern punched in the card 104b can be readily seen by reference to Fig. 2. A perforation 142ª in the first position of the top row, counting from right to left, permits a reading rod to pass through and close its associated contacts, in this case, the contacts 142, which prepares the circuit of bell 140 for subsequent completion by the cam operated contact 135. A perforation 152ª in the fourth position of the top row provides for the closure of contacts 152 to prepare the circuit for discarding relay 151. A perforation 155ª in the fifth position of the fifth row (counting from the bottom of the card) permits the closure of the correspondingly located contacts, providing the time roller 47 has been rotated to a position in which it presents an aperture for the reception of the reading rod associated with these contacts. In the present instance, the time roller will be so positioned on the fifth day of the operating cycle of the device, for example on Thursday. A perforation 156ª in the third position of the fourth row permits contacts 156 to close, providing the time roller 46 presents an aperture opposite this position. As before explained, time roller 46 is rotated to present an aperture in this position during the third quarter of each day, that is between noon and 6 p. m. A perforation 157ª in the second position of the third row permits contacts 157 to close when the time roller 45 presents an aperture opposite this position as it does during the second hour of each quarter of the day. A perforation 158ª in the second position of the second row permits contacts 158 to close when the time roller 41 presents an aperture opposite this position as it does during the second ten minute interval of each hour. Finally, a perforation 159ª permits contacts 159 to close when the time roller 35 presents an aperture in this position, which it does every tenth minute.

Interpreted, the data recorded by the perforations in the card 104b indicates that the bell 140 is to ring once at 1:15 p. m. on Thursday, and that the operation is not to be repeated the following Thursday. For convenience in identifying the card, this data may be printed upon the card in a position in which it may be readily seen when the card is in any of the three positions in the card handling mechanism.

To proceed with the description of the operation of the device, during the minute preceding the time indicated on the pattern card, i. e., between 1:14 p. m. and 1:15 p. m. on Thursday, the springs 14 will stand in their forward position. The reading rods 17 will project through the holes 142ª and 159ª in the card 104b and their associated contacts will be closed but without effect as the circuits in which they are included will be open at the cam controlled contacts 135 and 139. One reading rod in each of the time rows will find a perforation in the card and those in the second to fifth rows, inclusive, will also find apertures in the time rollers into which they can project and effect the closure of their associated contacts. The fifth reading rod of the first row will find a perforation in the card but will not find an aperture in the time roller 35 as this roller will be presenting an aperture opposite the fourth position of the bottom row. Consequently, the contacts associated with the said fifth reading rod, i. e. contacts 159, will remain open and no circuit will be completed for the motor operating relay 121.

At 1:15 p. m., or slightly before if allowance is to be made for the slight lag introduced by the cam formations, the cam 13 will bring about the retraction of the reading rod plate, retracting all of the reading rods and opening their associated contacts. At the same time time roller 35 will be notched forward a step so that the pattern defined by the apertures in the time rollers will now correspond exactly with the pattern punched in the card 104b. This shifting of the time roller will occupy a very short interval and the cam will immediately permit the reading rod plate and reading rods to shift to their forward positions. A reading rod in each time row will now find a perforation in the card and an aperture in the associated time roller into which it will project and thereby complete a chain circuit via contacts 155, 156, 157, 158 and 159 for relay 121. Relay 121 energizes in this circuit and closes the circuit of the motor 1 which starts to rotate the various cams associated therewith.

From this point on, a number of different operations take place which can be most easily followed by referring to the cam operations diagram of Fig. 12. After approximately one second (or less depending upon the cam face) continuity cam 9 will close its contacts 131 and 132 thereby completing the energizing circuit for relay 151 and the locking circuit for relay 121 as previously described. The continuity cam contacts 131 and 132 will remain closed until near the end of the rotation of the shaft 2, say to the fifty ninth second of the period. At the first second, the contacts 135 of the grounding cam 8 are closed and complete the circuit for the bell 140 which, accordingly, rings. The contacts 135 may remain closed for one or more seconds, depending upon the length of the ringing or other signal desired. In the present instance, a contact closure of two seconds is provided.

The next group of operations resulting from the closure of the chain circuit is concerned with the handling of the pattern cards. At approximately the second second of the period, cam 10 will swing the card cradle arm and cradle 69 into the position shown in dotted line in Fig. 1. This operation may be spread over whatever period is necessary, in the present instance three seconds being provided. As the cradle reaches its upper position, the card carried therein is removed and placed in the storage rack as previously described. At the same time, a new card will be started from the storage rack by the plate 53. The cradle then returns to its lower position to await the depositing of the next card therein.

At the thirty-first second of the period, reading rod plate control cam 7 will bring about the retraction of the reading rod plate 19 thereby withdrawing the reading rods from the path of the pattern cards. This cam will maintain the plate in retracted position until near the end of the period, at which time the timing cam 13 will become effective for this purpose. This is done so that a new pattern card positioned for reading will not become effective prematurely.

At the thirty-third second of the period, and after sufficient time has elapsed for the reading rods to be moved back, the cams 4 will permit the card frame to drop and carry the cards 104ª and 104b to the next position, i. e., card 104ª to "reading" position and card 104b to "display" position as shown in Fig. 2. When sufficient time has elapsed for the cards to be properly positioned, for example, at the thirty-sixth second, the cam 5 will operate to open the card grasping fingers and release the cards in their new positions. Shortly thereafter, the cams 4 will raise the card frame to its upper position in which the cam rods will engage the frame projections 58 and thereby permit the fingers 91 to grasp the cards just positioned.

It will be recalled that relay 151 was energized early in the period. This relay has remained energized in a locking circuit controlled by the continuity cam 9 and has prepared a circuit for the discard magnet 116. Accordingly, when cam 6 closes its contacts 136 at the fifty-first second of the period, magnet 116 will become energized and discard the card 104b which has just been moved down to the display position as above described.

At the end of the period, that is after one complete revolution of the shaft 2, the continuity cam 9 will open the circuit of the relay 121. The relay will become de-energized and, in turn, will open the circuit of the motor 1. The motor, accordingly, stops and the various cams remain in normal position until another operation is indicated by a pattern card. A test such as that above described is made each minute of the card in "reading" position, the tests being effected by the cam 13 and time rollers.

When it is desired to increase the capacity of the program device without increasing the number of reading rods employed, the auxiliary apparatus shown in Fig. 13 is employed. This apparatus is connected directly to the contact springs 14 and thereupon becomes an integral part thereof. No change is required in the device or its method of operation as hereinbefore described. With this apparatus in use, however, each circuit will be designated by a particular pattern formed by a plurality of perforations in the record medium instead of by a single perforation as previously described. Accordingly, by employing twenty of the circuit contacts, one hundred separate circuits can be controlled individually. The use of thirty of the circuit closing contacts increases the capacity to one thousand separate, individual circuits. In case even greater capacity is desired, additional contact rows can be added.

As illustrated herein, the auxiliary apparatus is arranged for the control of one thousand separate circuits and is further provided with selecting means for connecting any of the said circuits with any one of three cam controlled switches. In the present instance, the circuits are divided into groups of ten circuits each, and each circuit group is controlled by a separate relay designated A1, A2, B1, J1, etc. The operation of any relay connects its associated circuits to respective ones of the ten conductors 160 which are connected respectively to ten contact springs 14 of the program device. For the purpose of illustration, the conductors have been shown as connected to the contact springs located in the second row from the top, but it will be appreciated that they may be connected with any ten of the circuit contact springs with which the program device is provided.

The various relays A1, B1, etc., are arranged in groups of ten, the groups being designated respectively A1, A2—A10, B1—B10, etc. In this instance the letter indicates the relay group and the numeral the position of the relay in the group. The lower terminal of the relays in corresponding positions of each group are multiply connected, that is all of the number 1 relays are connected in multiple, all of the number two relays connected in multiple, etc. Each multiple circuit is further connected over a conductor 161 to a contact spring 14 in the upper row of the program device. Accordingly, each of the ten contact springs is effective to close a point in the circuit of one relay in each of the ten relay groups A—J.

The upper terminals of the ten relays of each group are multiply connected to respective conductors 162 leading to ten contact springs of the program device. In this instance, the relays of the first six groups are connected to contact springs in the fourth row and the relays of the last four groups are connected to contact springs in the third row (counting from the bottom). It is apparent, therefore, that any desired one of the one hundred relays constituting the ten groups above described may be individually energized by the closure of the proper contact in each of the two contact spring rows. Moreover, a selected one of the ten circuits extended over the conductors 160 by the energized relay may be completed by the closure of the proper contact spring in the second row. Thus, by means of a pattern defined by three perforations in a pattern card any selected one of the one thousand circuits for which the apparatus is equipped may be connected to the common conductor 163.

A further selection is provided by the three spring contacts in row five (from bottom) each of which is arranged to connect the conductor 163 with a separate cam controlled switch. The first contact set in this row, for example, extends the connection to switch 164 which is actuated by the cam 165 to transmit two short current impulses over the circuit at two spaced intervals. The second contact set extends the connection to switch 166 which is actuated by cam 167 to transmit one long current impulse over the circuit. The third contact set extends the connection to switch 168 which is actuated by cam 8 to transmit one short current impulse over the circuit. The cams referred to are preferably fast on the shaft 2 as described hereinbefore.

To illustrate the manner in which the auxiliary apparatus shown in Fig. 13 operates in conjunction with the program, several of the exemplary controlled devices are shown connected with the apparatus. For example, the bell 140 is shown connected in the circuit which terminates at contacts 169 controlled by the relay A10. As in the previous instance, the bell is also connected to one terminal of the grounded generator 141 and, therefore, to ring the bell, the circuit through contacts 169 must be completed to ground. To further illustrate the operation of the program device and the auxiliary apparatus, the relays 145 and 148 have also been shown connected to the apparatus. In the present instance, relay 145 is shown connected to contacts 170 of relay B1 and relay 148 is shown connected to contacts 171 of relay J10. The closure of these and associated contacts complete the relay circuits as will be described presently.

By way of example, let it be assumed that the bell 140 is to ring for a relatively long interval at the time stated in the previous description of this operation, i. e., at 1:15 p. m. on Thursday. A pattern card 172 perforated as shown in Fig. 14 will be provided for effecting this operation and will be delivered to the card reading mechanism of the program device in the manner hereinbefore described. It will be noted that the time pattern of this card is identical with that of the card 104b (Fig. 2) and its effect on the program device is exactly the same. At the time indicated by the pattern, the reading rods find the apertures in the time rollers alined with the perforations in the pattern card and initiate the operation of the cam driving motor 1. In this case, however, the circuit identifying pattern consists of four perforations, one perforation in each of the four upper rows. The perforation 142ª in the tenth position of the topmost row permits the reading rod to close its associated contacts 142 and close one point in the circuit of relay A10. A perforation 172ª in the first position of the fourth row permits a reading rod to close contacts 172, thereby completing the circuit for energizing relay A10. The relay upon energizing closes the contacts 169 and other similar contacts extending the various circuits over conductors 160. A perforation 173ª in the sixth row of the card extends the particular conductor 160 leading from contacts 169 to conductor 163. Finally, a perforation 174ª in the fifth row of the card permits a reading rod to close contacts 174 and thereby extend the circuit of bell 140 through to the switch 166 which is closed to ground by cam 167 incidental to its rotation. This operation having been completed, the card is shifted out of reading position in the manner hereinbefore described.

The energization of the relay 145 under control of a pattern card will be readily understood from a description of the pattern required to effect the circuit closure. The time pattern will be such as to initiate the operation of the cam motor 1 at the proper time as previously explained. The circuit pattern in this case will comprise a perforation in the first position of the topmost row and a perforation in the second position of the fourth row, permitting the closing of contacts 175 and 176, respectively, and thereby completing the energizing circuit for relay B1. The pattern will also include a perforation in the first position of the sixth row and a perforation in the third position of the fifth row, permitting the closing of contacts 177 and 178, respectively. The closure of the two contacts mentioned together with the closure of contacts 176 by relay B1 extends the circuit of relay 145 to cam switch 166 which is closed by cam 8 incidental to its rotation. Relay 145 locks over its contacts 146 and contacts 147 of relay 148.

In order to de-energize relay 145, relay 148 may be energized momentarily to open contacts 147 and thereby interrupt the locking circuit of the first mentioned relay. The pattern necessary to complete the circuit for relay 148 as shown comprises perforations in the tenth, fourth, first and third positions of rows seven, three, six and five, respectively. These perforations permit the closure of contacts 171, 179, 177 and 178, thereby extending the relay circuit to the cam switch 168 which completes the circuit.

We claim as our invention:

1. The combination comprising, a program device, a series of separate, independent pattern cards, each card bearing a pattern indicative of a particular operation included in the program of the device and a pattern indicative of the time at which such operation is to become effective, means for automatically feeding the cards to the program device, and means to effect the operations at the proper times including means operative under joint control of both patterns on a card.

2. A circuit closing device comprising, in combination, pattern sensing mechanism, a pattern card, a time varied pattern, means for periodically sensing the card pattern and the varied pattern, and means operated in response to the occurrence of a particular correspondence between the two patterns for closing an electrical circuit.

3. In a program device in which the respective operations constituting the program are controlled by individual record media upon which is recorded data indicative of the operations and other data indicative of the time at which the operations are to be effected, means for automatically feeding the record media into the device, means for reading the data recorded on the media, and means controlled by said last means for effecting the operations according to the program of the device.

4. The combination with a card reading mechanism, of a file of pattern cards, means for removing the cards one by one from one end of the file, means for presenting the cards in the order of their removal in operative relation with said mechanism, means normally effective to return the cards to the other end of the file, and means for by-passing said last means to effect the discard of selected ones of the cards.

5. A time change-over mechanism for a program device comprising, in combination, a series of pattern elements, apertures in said elements, and means for shifting said elements with respect to each other to position the apertures in a series of progressively changing patterns, each of said patterns including simultaneously an aperture in each of said elements.

6. A time change-over device comprising, in combination, a plurality of rotatable cylindrical members each having a series of angularly spaced peripheral apertures, and means for rotating said members at predetermined different speeds to position the apertures in a series of progressively changing patterns.

7. A device for producing a series of progressively varying patterns comprising, in combination, a plurality of members each having a series of pattern forming elements, and time controlled mechanism for changing the relative positions of said members in predetermined order to position the elements thereof in distinctive patterns.

8. The combination with a record reading device, of a series of separate record media, means for successively positioning the media in operative relation to the device, automatically operated means for selectively discarding certain of the media, and means for automatically successively positioning the remaining media in operative relation to the device.

9. A device for reading data recorded as a perforated pattern in a pattern card comprising, in combination, a group of rods positioned to pass through the perforations in the card to effect a reading of the data represented thereby, a variable pattern device adapted to obstruct the perforations in the card and to prevent the movement of the rods beyond the plane of the card, and means for varying the pattern of said device in a predetermined manner such that the obstruction is removed from preconcerted combinations of the apertures in a definite sequence.

10. A device for reading data recorded on a record medium comprising, in combination, a pattern mechanism variable in a predetermined manner to form a series of different patterns one of which corresponds to the record on said medium, a group of record reading members, and means for positioning said members to compare the record on said medium with said series of patterns.

11. In a program device, in combination, a series of separate pattern cards each carrying data identifying a particular section of the program of the device, the data including a time indicating pattern, a pattern sensing mechanism for the device, a time varied pattern, a member for presenting the pattern cards to said mechanism one-by-one, means including said mechanism for periodically sensing the time indicating pattern and for effecting a comparison of that pattern with the time varied pattern until the two patterns are found to correspond, and means thereupon rendered effective to withdraw the card from the mechanism and to present the succeeding card of the series thereto.

12. In a program device, in combination, a control medium in the form of a member carrying a group of perforations arranged in a predetermined pattern, a progressively variable pattern mechanism alined with the pattern of said medium, a group of pattern reading rods, means for shifting said rods into engagement with said medium and said mechanism to effect a comparison of the patterns thereof, means for periodically retracting the rods, and means actuated by said retracting means for varying the pattern of said mechanism.

13. In a program device, in combination, a control medium in the form of a member having a group of perforations arranged in a predetermined pattern, a series of relatively movable elements having spaced apertures adapted to be arranged in progressively varying patterns in accordance with the relative positions of said elements and to be alined with the pattern of said medium, a group of pattern reading rods, means for shifting said rods into engagement with said medium and said mechanism to effect a comparison of the patterns thereof, means for periodically retracting said rods, and means actuated as an incident to the retraction of said rods for changing the relative positions of said elements to vary the pattern arrangement of said apertures.

14. The combination comprising, record reading mechanism, a variable record, a fixed record, means for varying said first record in a predetermined manner, and members included in said reading mechanism for effecting a comparison of the records after each invariation of the first record.

15. In a program device, in combination, a storage rack containing a serially arranged group of pattern cards each of which designates a particular operation of the program and the time at which the operation is to be effected, a pattern reading device, mechanism for transferring the cards one-by-one from the rack to the reading device in the order of their serial arrangement, means associated with the reading device for retaining each card in the device until the time indicated by the pattern thereon and for effecting the operation designated by each card at the time indicated, and other mechanism for returning the cards to the rack in their initial serial order.

16. A pattern card reading mechanism comprising, in combination, a plurality of spaced rods, a switching device associated with and controlled by each of said rods, said devices being effected when operated in predetermined combinations to selectively initiate the operation of the apparatus under the control of said mechanism, means for shifting the rods longitudinally to bring their respective ends into engagement with a pattern card having perforations defining a predetermined pattern, a plurality of elements disposed on the opposite side of the pattern card and adapted when alined with the perforations in the card to prevent movement of the rods beyond the plane of the card, apertures in said elements, mechanism for shifting said elements relative to each other to cause the apertures to register with the perforations in the card and thereby permit the movement of the rods through the perforations and beyond the plane of the card, and means controlled by the switching devices incident to such movements of the rods for completing a circuit effective to initiate the particular operation designated by the pattern in which the perforations are arranged.

17. The combination comprising, a pattern card having a series of perforations arranged to form a distinctive pattern, a plurality of rods yieldably supported for longitudinal movement toward and from the card, said rods being adapted to pass through the perforations and extend beyond the card unless otherwise obstructed, a plurality of relatively movable elements disposed adjacent said card and adapted to obstruct the movement of said rods beyond the card, apertures in said elements, means for shifting said elements relative to each other to arrange said apertures in a pattern corresponding to the pattern of the perforations of said card, means for shifting the rods toward said card to project certain of the rods through the perforations and into said apertures, and means controlled by the rods entering the apertures for effecting a circuit closing operation.

18. A mechanism for handling pattern cards comprising, in combination, a reciprocating rack having one set of members adapted to grip a card and to carry the same from a starting position to an intermediate position in one stroke of the rack, means for holding the card in said intermediate position during the return stroke of the rack, a second set of members for said rack adapted to grip the card and carry the same from said intermediate position to a succeeding position in the following stroke of the rack, and means for reciprocating said rack.

19. A card handling mechanism as claimed in claim 18 having means actuated incident to the reciprocation of the rack operable to cause the several members to grip and release the cards.

20. A card handling mechanism as claimed in claim 18 having a cam actuated mechanism for reciprocating the rack, said mechanism being arranged to provide a dwell between successive strokes of the rack.

21. In a program device, in combination, a storage rack containing a plurality of pattern cards each having a group of perforations arranged in a distinctive pattern, a card analyzing mechanism having a plurality of separate stations for analyzing and displaying the cards, and card handling mechanism for transferring the cards individually step-by-step from said rack to the first station of the analyzing mechanism, thence through the other station of the analyzing mechanism, and finally back to said rack, said handling mechanism including a reciprocating rack having means for automatically gripping and releasing the cards.

LESTER M. PLYM.
MARON W. NEWCOMB.